United States Patent
Smiljanić et al.

(10) Patent No.: US 11,541,422 B2
(45) Date of Patent: Jan. 3, 2023

(54) ULTRASONIC GRIP SYSTEM

(71) Applicant: Mario Smiljanić, Mostar (BA)

(72) Inventors: Mario Smiljanić, Mostar (BA); Darko Zovko, Medugorje (BA)

( * ) Notice: Subject to any disclaimer, the term of this patent is extended or adjusted under 35 U.S.C. 154(b) by 930 days.

(21) Appl. No.: 16/343,003

(22) PCT Filed: Oct. 12, 2017

(86) PCT No.: PCT/BA2017/000006
§ 371 (c)(1),
(2) Date: Apr. 18, 2019

(87) PCT Pub. No.: WO2018/076078
PCT Pub. Date: May 3, 2018

(65) Prior Publication Data
US 2020/0055086 A1   Feb. 20, 2020

(51) Int. Cl.
*B06B 1/06* (2006.01)
*B60B 27/00* (2006.01)
(Continued)

(52) U.S. Cl.
CPC ............ *B06B 1/06* (2013.01); *B60B 27/0047* (2013.01); *B60C 1/0025* (2013.01); *B60T 8/56* (2013.01);
(Continued)

(58) Field of Classification Search
CPC . B06B 1/06; B60B 27/0047; B60B 2900/331; B60B 2900/551; B60B 2900/721; B60C 1/0025; B60T 8/56
(Continued)

(56) References Cited

U.S. PATENT DOCUMENTS 5,386,863 A * 2/1995 Hashimura ............. B60C 13/00
152/523
8,365,589 B2 * 2/2013 Schreiner ............. B60C 23/041
73/146.5
(Continued)

FOREIGN PATENT DOCUMENTS

DE           3640468 A  *  6/1988  ......... B60C 23/0469
DE   10 2010 047818 A1   6/2011
(Continued)

OTHER PUBLICATIONS

Pandey et al., Energy Generation in Tyres using Piezoelectric Material, vol. 9 Issue 07, International Journal of Engineering Research & Technology (IJERT), Jul. 2020, pp. 1178-1182 (Year: 2020).*

(Continued)

*Primary Examiner* — Clayton E. LaBalle
*Assistant Examiner* — Kevin C Butler
(74) *Attorney, Agent, or Firm* — John Alumit

(57) ABSTRACT

Acoustic medium of ultrasonic grip system consists of piezoelectric generator (1), wheel knuckle (9), ball bearing (10), wheel hub (11), wheel rim (15) and tyre of motor-car (20). The piezoelectric generator (1) creates ultrasound vibrations which are transferred through the acoustic medium to the surface of tyre (17). The ultrasound vibration on the surface of tyre (17) results in the separation of the surface of tyre (17) from the liquid (18) that may be found on tarmac (19) during the rain, which results in the fact that despite the unfavourable weather conditions the motor-car has an optimum rolling surface of tarmac. Also, the vibrations on the surface of tyre (17) in interaction with micro texture of tarmac increases the contact surface of tyre with tarmac, which results in the increase of coefficient of friction, higher grip of tyre and reduction of braking distance of motor-car. The ultrasonic grip system is activated at sudden (Continued)

Figure 1:
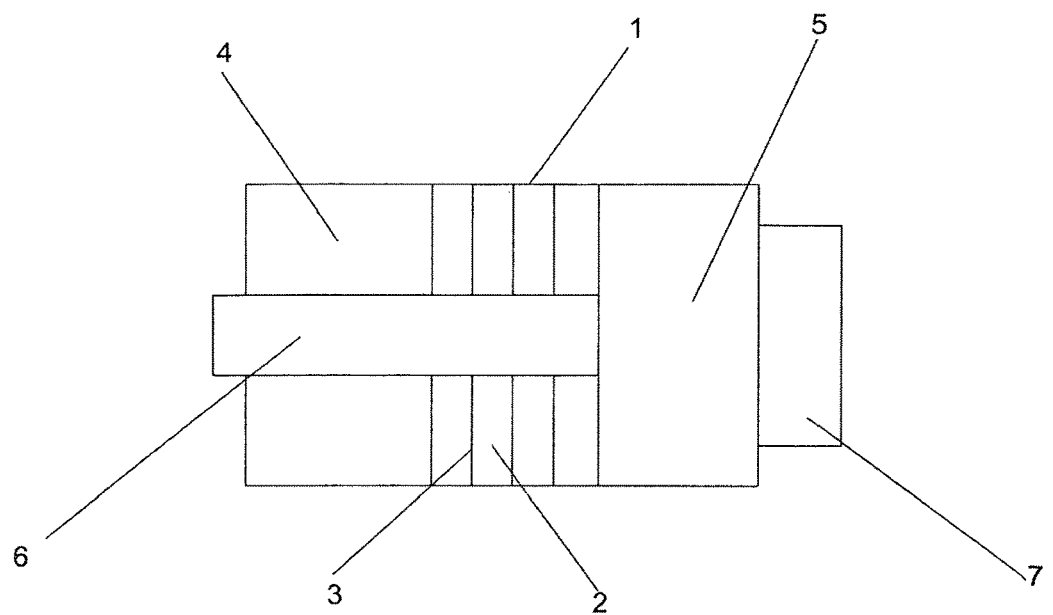

braking, resp. activation of ABS system. Also, the system is activated on the occasion of activating the ESP and ASR system.

8 Claims, 3 Drawing Sheets

(51) Int. Cl.
  *B60C 1/00* (2006.01)
  *B60T 8/56* (2006.01)
(52) U.S. Cl.
  CPC ... *B60B 2900/331* (2013.01); *B60B 2900/551* (2013.01); *B60B 2900/721* (2013.01)
(58) Field of Classification Search
  USPC ........................................................ 310/348
  See application file for complete search history.

(56) References Cited

U.S. PATENT DOCUMENTS

| | | | |
|---|---|---|---|
| 2002/0121132 A1* | 9/2002 | Breed | B60C 19/00 73/146 |
| 2004/0016486 A1* | 1/2004 | Tropper | B60C 11/00 152/151 |
| 2008/0084138 A1* | 4/2008 | Micallef | H02N 2/18 310/339 |
| 2019/0193615 A1* | 6/2019 | Mankame | G08B 6/00 |
| 2020/0055086 A1* | 2/2020 | Smiljanic | B60B 39/00 |
| 2020/0238781 A1* | 7/2020 | Hadi | B60G 17/0152 |
| 2020/0348757 A1* | 11/2020 | Forest | G06F 1/1616 |
| 2021/0028725 A1* | 1/2021 | Griswold | B60C 23/0411 |
| 2021/0170789 A1* | 6/2021 | Bertoia | G01L 5/0019 |

FOREIGN PATENT DOCUMENTS

| | | | | |
|---|---|---|---|---|
| DE | 102010047818 | * | 6/2011 | ........... B06B 1/0618 |
| DE | 102010047818 A1 | * | 6/2011 | ............. B60B 39/08 |
| DE | 102020118263 A1 | * | 1/2021 | ............. B60C 19/00 |
| JP | 2008175665 A | * | 7/2008 | |
| WO | WO-9742790 A1 | * | 11/1997 | ........... B06B 1/0618 |
| WO | WO2015/196261 A1 | | 12/2015 | |
| WO | WO-2015196261 A1 | * | 12/2015 | ............... B06B 1/06 |
| WO | WO-2015196261 A1 | * | 12/2015 | ............... B06B 1/06 |
| WO | WO-2018076078 A1 | * | 5/2018 | ............... B06B 1/06 |

OTHER PUBLICATIONS

Souad Touairi et al., Vibration harvesting integrated into vehicle suspension and bodywork, Indonesian Journal of Electrical Engineering and Computer Science, vol. 23, No. 1, Jul. 2021, pp. 188-196 (Year: 2021).*

Elizabeth G. Armstrong et al., Investigation into use of piezoelectric sensors in a wheeled robot tire for surface characterization, Journal of Terramechanics, Jul. 9, 2015, 16 pg(s) (Year: 2015).*

B. Lafarge, Analysis and Optimization of a Piezoelectric Harvester on a Car Damper, Elsevier, 2015 International Congress on Ultrasonics, 2015 ICU Metz, 4 pg(s) (Year: 2015).*

Doaa Al-Yafeai et al., A State-of-the-Art Review of Car Suspension-Based Piezoelectric Energy Harvesting Systems, MDPI, May 7, 2020, 39 pg(s) (Year: 2020).*

* cited by examiner

ULTRASONIC GRIP SYSTEM

1) FIELD OF TECHNICS WHICH THE INVENTION REFERS TO

This invention refers to the piezoelectric generator, suspension knuckle, wheel hub, wheel rim and pneumatic, and according to the International Patent Classification (IPC) it is classified as H01L 41/00, B60B 30/08, B60B 27/00, B60B 21/00, B60C 5/00.

2) TECHNICAL PROBLEM

The Solution of which Requires Protection

Safety element represents the most important characteristic of motor-cars. We divide the motor-car safety to active and passive safety. Active safety of motor-cars is represented by those components of motor-cars which may prevent a car accident such as brakes, tires, steering-wheel, etc., while passive safety is represented by those components which impair the consequences of a car accident such as a car chassis, seatbelt, airbag, etc.

The brakes, resp. the braking distance of motor-car is in a direct correlation with a coefficient of friction that is realised by pneumatic of motor-car wheels with tarmac. The higher coefficient of friction of pneumatic, the shorter braking distance of motor-car. The condition on the tarmac, resp. the weather conditions affect to the largest extent the friction between wheels and tarmac. Ideal conditions, which are clean and dry tarmac, enable the pneumatic of wheels to achieve the highest coefficient of friction, i.e. the lowest braking distance of motor-car braking. The problem is because often we do not have ideal conditions on the road, resp. on the tarmac. Deteriorated weather conditions such as rain, black ice, snow, etc. significantly reduce the friction of pneumatic with tarmac and extend the braking distance of motor-car. In addition to the afore mentioned weather conditions, different kinds of dirtiness may be found on the road surface such as sand, mud, etc., which also negatively affect the safety of car traffic.

Construction characteristics of tire, i.e. pneumatic, also affect the active safety of motor-car. Commercial pneumatic with its associated characteristics must make a compromise between opposite driving and dynamic needs that appear in everyday car traffic such as an operating life of pneumatic, braking at wet road surface, braking at dry road surface, etc.

3) SITUATION WITH TECHNICS

Overview and Analysis of Known Solutions of a Defined Technical Problem

There are solutions which resolve to some minor extent the afore mentioned technical problems.

When it comes to the problem with slippery tarmac, watered with rain, the manufacturers of cars pneumatic mostly rely on a design of a contact part of tire, the so called crown of pneumatic. The design of the pneumatic crown is characterised by longitudinal and transversal grooves, the purpose of which is to take away the liquid below the contact part of pneumatic. This solution is efficacious only to a certain speed degree of car motion which is considerably lower than those speeds achieved by cars in everyday traffic. Also, longitudinal and transversal grooves on the surface of pneumatic reduce the contact surface of pneumatic with tarmac which is negatively reflected during the car braking at dry tarmac.

Commercial pneumatic must meet the standards of the operating life of pneumatic which results in a harder component of tire of pneumatic and lower coefficient of friction which may be realised by such pneumatic with tarmac, unlike the pneumatic, which is not expected to reach a long operating life and which may have a softer component of tire of pneumatic which results in a higher coefficient of friction.

4) PRESENTATION OF THE ESSENCE OF INVENTION

As to Enable the Understanding of Technical Problem and its Solution as Well as the Mentioning of Technical Novelties of Invention as Compared to the Past Situation with Technics It is a primary goal of the invention to enable the system with a function of optimizing the rolling surface of pneumatic during the activation of safety systems of car.

The secondary goal of the invention is to make a simple integration of the subject invention with the existing systems of car.

Additional goals and benefits of the invention shall be partly presented in a description that follows in the text below, and they shall be partly learnt through the performance and application of the invention.

In everyday traffic the condition on the road is of immeasurable importance for safety of motor-cars. In addition to the ideal conditions on the road, which are clean and dry tarmac, we assume in the first place the conditions on the road, resp. tarmac to include everything that can be found on the surface of tarmac such as liquids watered by rain, black ice, snow, mud, sand and many other dirtiness which result in a decreased coefficient of friction between the car wheels and the road tarmac and which cause the extension of braking distance of cars, representing a significant safety risk of car trafficking.

This assumed invention partly resolves in an innovative manner the afore mentioned problem.

The idea is to enable the source of vibration that shall efficiently transmit the vibration to the surface of pneumatic of the car wheels. We assume under the source of vibration to be a generator of mechanical vibrations and a location of placing the generator of mechanical vibrations. The location of placing the vibration generator is of crucial importance when it comes to the simplicity and efficacity of transmitting the vibrations from generator to the surface of the wheel pneumatic. A suspension_knuckle has been chosen for placing the generator of mechanical vibrations, resp. a holder of the wheel hub of the motor-car. The suspension_knuckle has been chosen because it enables a direct accoustic connection to the pneumatic for transmission of vibrations, and at the same time towards and through the parts of suspension of cars it also has a muffled way of spreading the vibrations. An actuator based on piezoelectric material has been chosen for generator of mechanical vibrations. Piezoelectric materials such as different types of ceramics, polymer, crystal and their combinations have in their inverse, resp. indirect mode of operations the possibility of direct transformation of electric energy to mechanical vibration. The inverse piezoelectric effect consists in mechanical deformation of converter, resp. generator when it is put into electric field, i.e. when it is electrified by some quantity of electricity. We have mentioned the suspension_knuckle of wheel-hub as an ideal location for placing the generator of mechanical vibrations, whereby the generator of vibrations may be placed as necessary to any corresponding part of suspension and wheel of motor-car. Also, the generator of mechanical vibrations can be made of piezoelectric, magnetostrictive and any other material which has the ability to generate vibrations. We have at our disposal a large number of different kinds and forms of vibration generators which may be used for the afore stated purpose but according to certain characteristics of design and mode of operation, the so called piezoelectric Langevin generator of mechanical vibrations represents a functional choice. During the selection of a frequency, by means of which the generator vibrates, we have at our disposal a whole spectrum of sound, resp. vibrations but the generating of vibrations in ultrasound area of spectrum represents a purpose-serving choice.

Langevin piezoelectric generator is mechanically connected to the suspension_knuckle of motor-car and it is connected through cables with the electric system of motor-car. This Langevin generator consists of two or more mechanically coupled piezo actuators which are connected on front and back side with passive resonators.

This assumed innovative system functions in the following way.

At sudden braking of motor-car, resp. activating of ABS system, a central computer unit of motor-car sends through electric system the voltage to the Langevin piezo generator which is fixed to the suspension_knuckle, resp. carrier of a wheel-hub of motor-car because of which the Langevin generator transforms the voltage to mechanical vibrations which are spread through the suspension knuckle, ball bearing, wheel hub and wheel rim to the surface of pneumatic. An ultimate goal of piezo generator is to create high frequency vibrations at the surface of pneumatic. High frequency vibration in ultrasound spectrum on the surface of pneumatic results in a separation of the surface of pneumatic from the liquid that may be found on the tarmac during the rain, which finally results in the fact that despite the rain and other unfavourable weather conditions the motor-car still has a clean and dry tarmac due to sudden braking, resp. activating the ABS system. Also, at the activation of safety systems such as ESP and ASR, when the targeted braking is performed by individual wheel, this innovative system produces the ultrasound vibration on the surface of that pneumatic which carries out the braking.

5) SHORT DESCRIPTION OF A DRAWING

The accompanying drawings, which are included in the description and which make the description of the invention, illustrate the best way for the performance of the invention so far.

Figure 2:
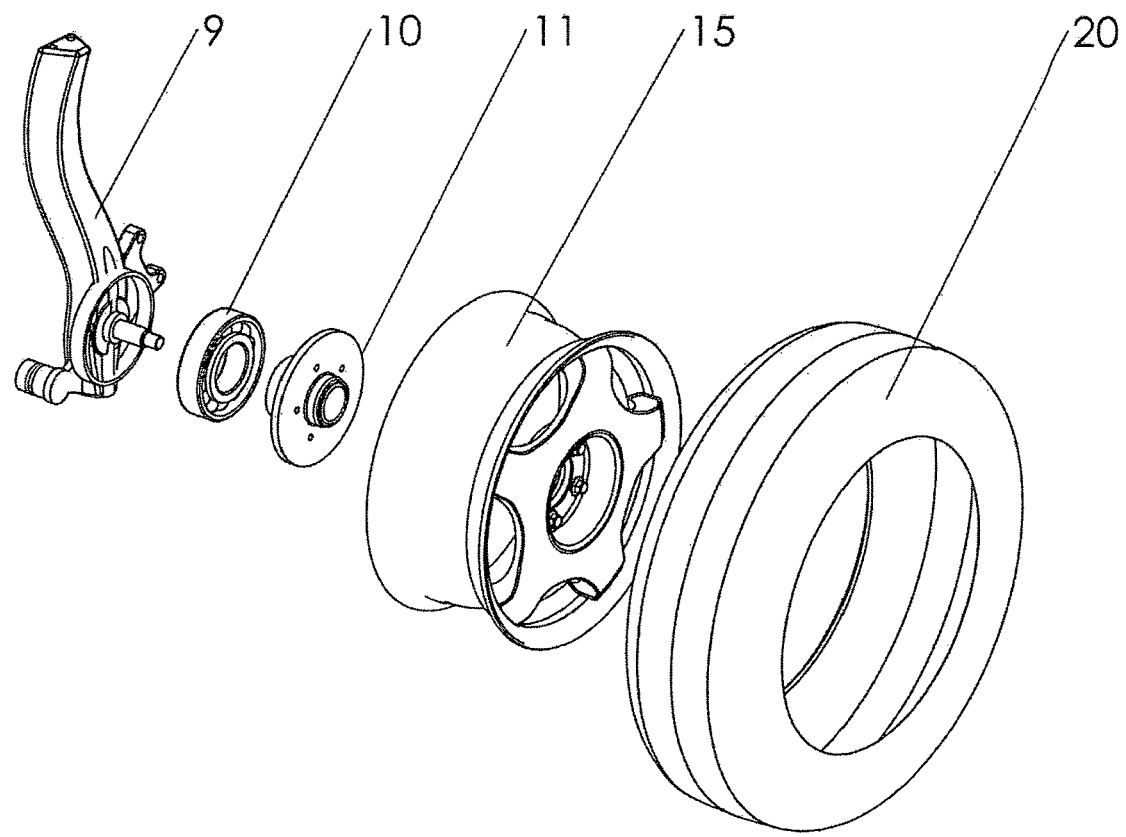
Figure 3:
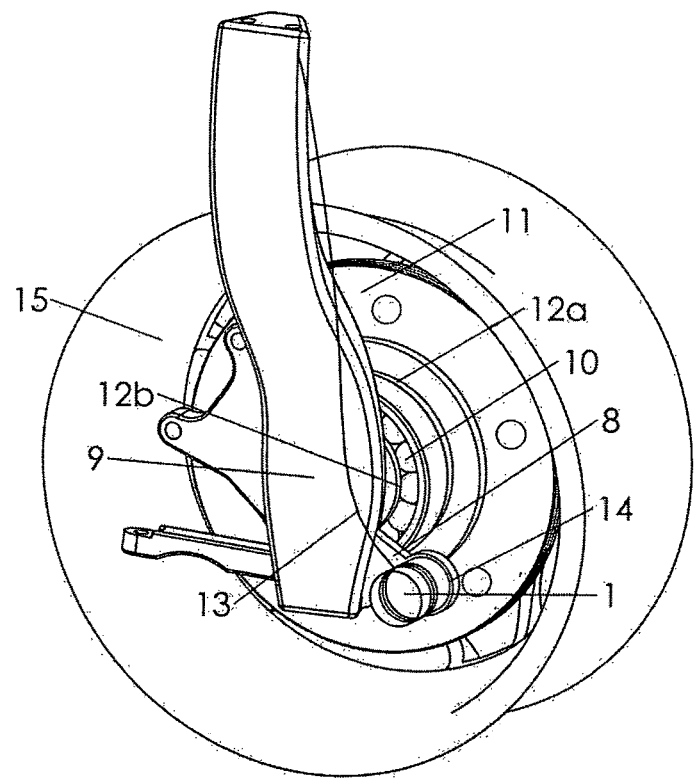
Figure 4:
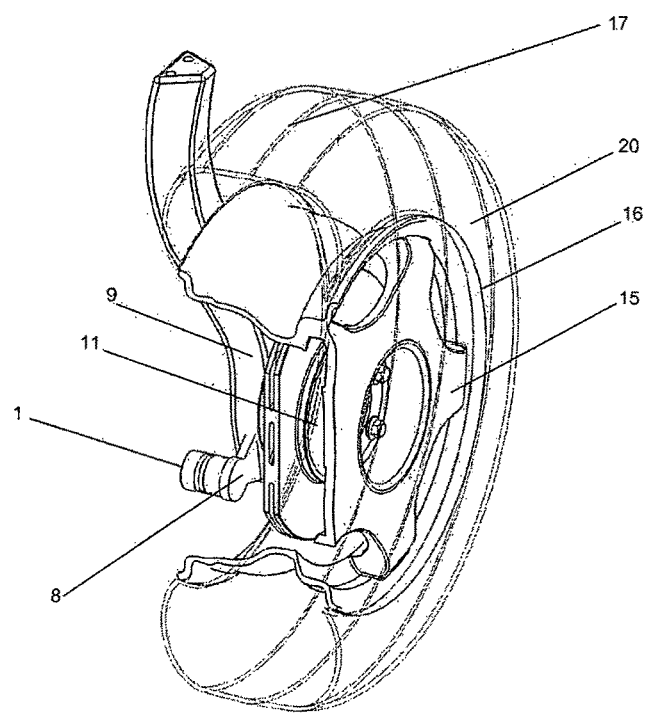
Figure 5:
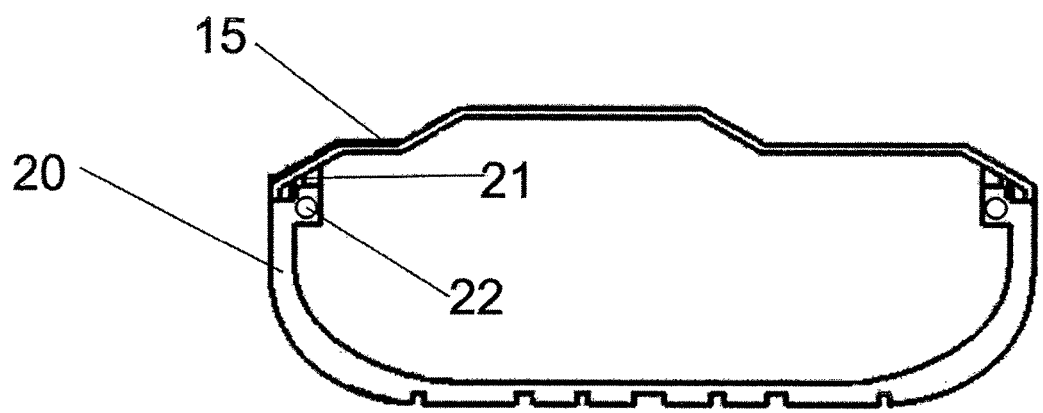
Figure 6:
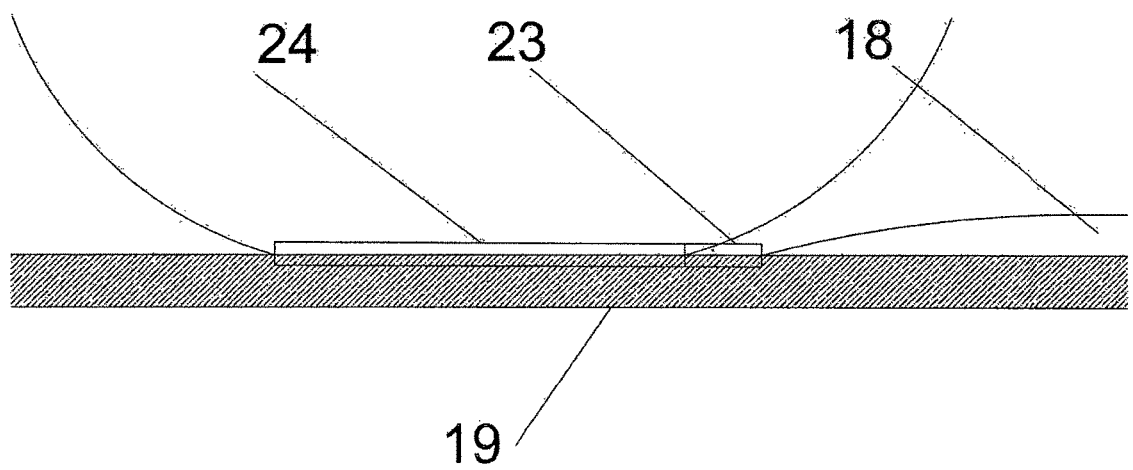

FIG. 1 shows the Langevin piezoelectric generator.
FIG. 2 shows the accoustic system components.
FIG. 3 shows the suspension knuckle with the integrated piezoelectric generator.
FIG. 4 shows the wheel components in relation to the piezoelectric generator.
FIG. 5 shows the wheel rim and wheel pneumatic.
FIG. 6 shows the pre-contact and contact surface of pneumatic with tarmac.

6) DETAILED DESCRIPTION OF AT LEAST ONE OF THE WAYS OF THE INVENTION REALISATION

Now we are going to get acquainted with details of this assumed invention, the example of which is illustrated in the accompanying drawings.

In order to have a better understanding of the mode of operation of piezoelectric ultrasound generator 1, which is put on the suspension knuckle 9 of the wheel of motor-car, it is necessary to explain the principle of piezoelectric effect, construction of piezoelectric generator, basics of physics of ultrasound and acoustics of wheels and suspension of car.

Piezoelectric effect is a situation when the voltage is created on the surface of some materials during their mechanical deformation (direct effect), whereby the opposite formulation is also valid—mechanical deformation of materials when the voltage is brought onto its opposite surfaces (inverse effect). We call such materials piezoelectric materials or piezoelectrics. At piezo materials there is a mutual two-way connection between electric and mechanical features. For explanation of physics of piezoelectric effect, it is necessary that the piezoelectric material acts as a dielectric, resp. insulator. When there is no external electric field, the dielectric does not show any total dipole moment at all, resp. the external electric field does not appear, while when there is electric field we can notice some total dipole moment, resp. when there is electric field—the dipoles are induced in the dielectric. All individual induced dipole moments in the dielectric are oriented to the same direction, they are oriented opposite than the direction of the lines of force of electric field. It may shown that the electrical field and the potential inside and outside such a dielectric is equal to the ones which would be caused by the existence of the surface charge on dielectric. Such a surface charge is called "tied charge". The induced dipoles in the dielectric are manifested as a surface charge, and vice versa.

We can show the basics of physics of piezoelectric material in an example of non-polar crystal dielectric. Mechanically undeformed crystal does not show total polarisation and since the crystal is non-polar, the dipole moments are oriented symmetrically in such a manner that the total dipole moment of every group of ions disappears. However, if we compress the afore mentioned crystal, the thing that is going to happen is that in total sum of dipole moments there shall remain one part of vertical component, resp. at every group of ions the dipole moment shall appear as in case when the crystal is put into electric field. Pursuant to the afore mentioned, we can make a conclusion that in the course of the mechanical deformation the voltage shall appear on the surface of crystal.

Inverse effect (reverse effect) explains in the same way the phenomenon of mechanical deformation of crystal when the voltage is brought on the crystal's opposite surfaces. Then the electric field induces in the system of crystal cells the additional dipole moment in the direction, opposite from the lines of force of electric field. Since the system of ions aims for balance, i.e. to the cancellation of total dipole moment, then the elementary crystal cells spread or tighten, which finally results in the mechanical deformation of crystal whose operation has been done on the account of energy of electric field that derives from the voltage brought to the surface of crystal. Mechanical deformation of piezo material is in a direct correlation with the brought voltage. We have obtained in such a manner a simple, direct and precise mechanism of transforming the electric energy into mechanical energy. A transformation ability of piezoelectric generator is characterised by factor of coupling (K). Factor of coupling is used to express the ability of transforming the electric energy into mechanical energy. Generally, piezoelectric generator may be deformed with the brought sufficient voltage even up to several hundreds of micro meters. Today there are various piezoelectric generators at market which may precisely produce vibrations of only few microns; also, there are piezo generators which may produce with a special design the vibrations of up to several centimeters. In addition to the design, the performances of piezo generators largely depend on the type of piezoelectric material that makes a driving part of every piezoelectric generator, resp. actuator. Piezoelectric generators use to the largest extent the piezoelectric materials such as PZT ceramics, EAP polymers and different kinds of cermacial polymer syntheses. Also, different fabricated and natural materials may be used which possess piezoelectric features. In the selection of piezoelectric material a fact is taken that every piezoelectric material possesses its own resonant frequency (or several of them) which depends on the type, size and form of material.

For the needs of this invention an ultrasound system of the corresponding strength is necessary which consists of piezo generator, resp. electric mechanical converter and source of voltage that works in a defined scope of frequencies. Ultrasound converters generate a longitudinal vibration in the medium which they are connected with. In a construction of a complex composite piezoelectric generator-converter, the piezoelectric material, derived in the form of a ring, is located between the front and back metal extension. Such a construction is known as Langevin ultrasound converter, the so called sandwich converter. For the purpose of creating the ultrasound vibrations on the suspension_knuckle 9, the Langevin piezo generator, resp. converter 1 has turned out to be the most appropriate. Mechanical energy, obtained in the composite Langevin converter 1, is transmitted to the suspension_knuckle 9 through the coupled elements. Stimulating elements of the converter 1 are piezoceramical elements 2, made of piezoceramical material which is characterised by a high electric mechanical factor of coupling, possibility for significant elastic deformations and dielectric porosity. The most popular piezoelectric material with the afore mentioned characteristics is based on PZT (lead-zirconate-titanate). Referring to the FIG. 1; the composite Langevin converter 1 is made of two or more piezoceramical elements 2 which are mechanically coupled in a combination with passive resonators, resp. metal extensions 4 and 5. The front passive resonator 5 is called emitter and it is most often made of aluminium or duraluminium. The back passive resonator 4 is called reflector and it is most often made of steel. The emitter 5 is made as a rule of a lighter material unlike ' the back resonator 4 which is made of material with a high specific density of material: Mechanical coupling is realised by means of a high durable central screw 6 that is led through piezoceramical elements 2 in the form of a ring. By means of the screw 6 a whole complex construction of converter 1 has been brought to the position of static mechanical overpressure so the optimum coefficient of electric mechanical transformation of converter 1 has been obtained. This construction makes a resonant longitudinal system. Bringing the electricity to the stimulating elements of such construction creates the longitudinal vibrations of metal extensions which produce the ultrasound mechanical vibration. An amplifier 7 may be upgraded to the emitter 5 with the goal of efficacious transmitting of ultrasound vibration, resp. metal extension which is made by its form and dimensions so that the frequency of mechanical resonance of the mode of vibrating of the amplifier 7 is equal to the stimulating frequency of the composite ultrasound converter 1. With keeping of stimulating frequency, the amplifier 7 increases the amplitude of the exiting vibration.

For the operations in the inverse mode, the piezoelectric converter 1 must be supplied with the corresponding electricity. The electric component of this invention is made of the electric system made of the accumulator of electricity, computer unit of motor-car which monitors the system, generator of impulse of the corresponding frequency, and if necessary, generator of voltage and electrodes 3 belonging to the converter 1 as its integral parts. The accumulator is used as a primary source of charging the system with electricity. The computer unit of motor-car enables that the piezoelectric converter 1 is supplied with the electricity, resp. that it is activated on a parallel level with the activation of the safety systems of motor-car such as ABS, ESP, ASR, etc. The generator of impulse creates a high frequency electricity, the frequency of which is harnessed with resonant frequency of piezoelectric converter 1. The amplitude of mechanical vibration shall be the highest when the frequency of the input electric signal equals with the resonant frequency of stimulating element 2 of piezo converter 1. The resonant frequency may be determined in a wide range that is enabled by generator of vibrations based on piezoelectric material. If the network voltage of electric system of motor-car is lower than it is necessary for the piezo generator 1 to reach the optimum work, then the generator of voltage may be used for correction of voltage to the corresponding value. Every stimulating piezo element 2 from the front and the back side is coated by electrodes 3. The number of stimulating piezo elements 2 with the associated electrodes 3 at composite converter is always as a rule even number because the polarities on electrodes 3 of one element 2 are in the opposite direction from the polarity of the neighbouring element 2. We obtain in such a way the stretching out of piezo elements 2 opposite from one another which contributes to the efficacity of piezo converter 1.

The ultrasound on the surface of pneumatic 17 represents the most efficient way of separating the surface of pneumatic 17 from the liquid 18 on tarmac. Also, the ultrasound vibration enables the efficacious stretching of mechanical waves through the acoustic medium of suspension and wheels. The ultrasound is the sound with the frequency of mechanical waves in the spectrum above 20 kHz (20 000 Hz). Mechanical waves are the elastic vibrations of elements in solid, liquid and gas environments. In these environments the elements are mutually connected by elastic forces which means that the moving of one element causes the neighbouring element to move as well, resulting in the vibration of elements through elastic environment in the direction of stretching of vibration, resp. wave until the energy of the wave movements is spent. The vibration of elements around its balance position leads to the occurrence of compression and dilution. The processes of compression and dilution in the acoustic medium are exchanged in succession and transmitted together with the transmission of the very occurrence of vibration, and they are maintained in the alternating change of pressure which is applied in the environment in which the sound is produced. The compression and dilution in the medium depends on the elastic deformation, caused by the source of mechanical vibration. The frequency of vibration or the frequency represents the number of oscillations performed by the elements in the unit of time, resp. in a second. The unit for frequency, resp. for one complete oscillation in a second is 1 Hertz (Hz). The intensity of sound is marked in decibels (dB).

The acoustic medium of this invention is represented_by the components of suspension and wheels of car. Referring to the FIG. 2, the acoustic system of media consists of the suspension_knuckle 9, ball bearing 10, wheel hub 11, wheel rim 15 and pneumatic 20. Together with the piezoelectric generator 1, the acoustic system encompasses the function of the source of ultrasound vibrations and route of vibrations spreading. Also, this route is used for transmitting, transformation, concentration of mechanical energy of vibrations and increase of vibration amplitude.

The speed of the vibration spreading from one element to another is called the speed of sound and it depends on the medium through which the vibration is spread. The speed of sound is different in different media. The materials, out of which the acoustic system of the medium of this invention is made, are made of aluminium, steel, iron and rubber. The speed of sound through the aluminium amounts to about 5100 m/s, steel about 5900 m/s, iron about 5200 m/s and through the rubber (hard rubber) it amounts to about 1650 m/s. The thicker material, the faster and longer transmitted sound through that material. A wavelength is the distance between two closest points of wave that vibrate with the same frequency. With regard to the speed of sound through the structure of pneumatic and with the choice of certain frequency we can generate at the surface of pneumatic 17 the vibration of a desired wavelength.

The source of vibrations is at the suspension knuckle 9. The suspension knuckle 9 is a component of motor-car that carries the wheel hub 11 with the associated ball bearing 10 and it connects the parts of suspension with the wheel. Also, the suspension knuckle 9 is responsible for keeping the wheel in an upright vertical position. Referring to the FIG. 3, the suspension knuckle 9 represents the ideal place for the source of ultrasound vibrations because it enables for the piezoelectric generator 1 to have simple assembling, safe location, easy access to the electric installations 13 and perhaps the most important, it enables a direct hard (acoustic) connection to the pneumatic for transmitting of vibrations, and at the same time also towards and through the parts of the suspension of motor-car it has a deafened path of mechanical vibrations spreading. Depending on the type of the suspension, the suspension knuckle 9 may be of any form and dimension. Piezoelectric generator 1 is installed vertically on the vertical axis of the suspension knuckle 9, whereby the installation is possible also at other coordinates. It is foreseen that the suspension knuckle 9 of this invention is to be characteristic with its form by additional extension 8 to which the piezoelectric generator 1 of vibrations shall be fixed. The piezoelectric converter 1 is fixed to the extension 8 of the suspension knuckle 9 by screw, epoxy resin or some other medium of connection to the surface 14. The extension 8 is made in such a way that it realises an ideal acoustic contact 14 with piezo generator 1 and efficiently transmits the mechanical vibrations from piezo generator 1 to the suspension knuckle 9. Also, the piezoelectric converter 1, resp. generator may be installed at any part of motor-car as long as it is connected to the acoustic medium which may transmit the vibration to the wheel rim, resp. pneumatic of motor-car. There is an option of installing the additional piezo generators to the components of suspension whose basic purpose is the absorption of vibrations from piezoelectric generator 1 from the knuckle 9 towards the chassis of motor-car.

The wheel represents a rotor component of motor-car, while the rest of the motor-car is taken for stator component, including also the suspension knuckle 9. What enables an continuous mechanical connection and transmission of vibrations from piezoelectric generator 1 to the surface of tire 17 is a ball bearing 10. Ball bearing is a device that uses round elements, resp. small balls to connect the external ring with the internal ring into one mechanical whole. The purpose of small balls in ball bearing is to reduce the coefficient of friction during the rotation and to transmit radial and axial load. Depending on the type of use, one ring of ball bearing is rotated, while the other is stationary. In our case, referring to the FIG. 3, the external ring of ball bearing 10 is fixed without motions 12*a* with the suspension knuckle 9, whereas the internal ring freely rotates 12b together with the wheel hub 11 and the corresponding rim 15. The wheel hub 11 is a central part of the wheel to which the rim 15 is installed with the corresponding pneumatic 20.

As we have mentioned in the description of this invention and as it is presented in the FIG. 4, the source of vibration is at the suspension knuckle 9 of motor-car, and the desired effect of vibration takes place on the surface of the pneumatic 17. The piezoelectric generator 1 on the suspension knuckle 9 as the source of vibrations represents an external coercive force in the subject acoustic system. Due to the actions of external force, the coercive vibrations develop in the acoustic system. The frequency of coercive vibration in the system is equal to the external source, which means that the acoustic system shall carry out the transfer of vibration of equal frequency as in the source of the stimulating force regardless of the presence of different forms and media.

In addition to the frequency, one of the most important features of vibration in our acoustic system is the amplitude of mechanical wave. The amplitude is the biggest shift of a particle, resp. distance of particle from its balance position in the process of vibrating. The piezoelectric generator 1 generates the vibration of the amplitude of about 10 microns and that amplitude is kept in the process of spreading of mechanical waves through the suspension knuckle 9, ball bearing 10 and through the wheel hub 11. When the vibrations, resp. mechanical waves come to the metal hoop of rim 16, the amplitude of vibration increases which is caused by rim design (legs of rim) and higher elasticity of material (aluminium). The last chain link in our acoustic system is the pneumatic (tire) 20 of motor-car. Referring to the FIG. 5, we can see the cross-section illustration of the rim and tire with an emphasis to their mutual contact surface. Hermetising layer 21 is the part of pneumatic that realises the contact with the rim and prevents the loss of air. Wire hoop 22 is a bundle of steel wires that ensures a proper keeping, position on rim and hermetic quality of pneumatic. Technical characteristics of hermetic layer 21 and wire hoop 22 ensure efficacious transmission of vibrations from the rim to the pneumatic of motor-car. The tire additionally and to the largest extent increases the amplitude of ultrasound mechanical wave so that on the surface of tire 17, depending on the characteristics of the very tire, we can have the amplitude of vibration in the spectrum higher than one hundred microns.

With the aim of efficacious transmission of vibrations from the wheel rim to the surface of pneumatic, a possibility has been foreseen for creation of pneumatic with the expressed characteristics of structure for transmission of vibrations. The structure of a side, resp. structural wall of pneumatic has been made in a way that next to the wire hoop the additional metal elements have been integrated for the transmission of vibrations from the hoop of rim 16 over the side wall to the surface of tire 17. Metal elements connect the wire hoop of side wall of pneumatic with the interwoven steel wires of the crown of tire. An ultimate goal of the afore mentioned additional elements is that the side wall of tire is characterised by bigger firmness than the standard characteristic of side wall and smaller ability of amortisation in the process of transmission of vibrations.

In the text below related to the description of the invention we are going to mention the safety driving and dynamic effects which are the result of this innovative system.

The function of the ultrasound grip system is to create the ultrasound vibrations at the surface of pneumatic and to optimize the rolling surface of motor-car.

Ultrasound vibration on the surface of pneumatic creates the alternate field of high and low pressure. If the braking is done at wet tarmac, the field of low pressure on the surface of pneumatic creates the cavitation that separates by its action the liquid from the surface of pneumatic. The cavitation is a phenomenon of water evaporisation and creation of bubbles of water vapor. It develops at the moment when the water pressure becomes equal or lower than the pressure of saturating the water vapor. With regard to the way of stimulating, there are four types of cavitation. In our case the vibrating surface of pneumatic 17 in the contact with the still or almost still liquid 18 on the tarmac 19 creates the acoustic cavitation. The acoustic cavitation emerges as a consequence of the variation of pressure in the liquid when the ultrasound waves go through that liquid. The ultrasound vibration from the surface of pneumatic in the liquid in close vicinity forms bubbles that carry out the expansion and afterwards suffer the implosion, resp. collapse. The whole process happens in a very short period of time. The implosion of bubbles causes the occurrence of short term high temperatures and high pressures which reach the speed higher than 100 m/s. Referring to the FIG. 6, the afore mentioned phenomena are used as specific buffer zones between the precontact surface 23 of pneumatic and the rest of the liquid 18 from the tarmac. Also, during the braking at wet tarmac, the field of high pressure on the surface of pneumatic 17 creates a repellent force which rejects the liquid from the surface of pneumatic. The field of high pressure is the result of transmission of ultrasound vibrations from the surface of pneumatic 17 to the molecules of air that are in a direct contact with the surface of pneumatic. The air molecules take over the energy from the surface of pneumatic and with keeping the frequency they transmit the kinetics of vibration to the liquid in the precontact zone 23 of the wheel, due to which the liquid is removed before the pneumatic. Of course, the very kinetics of vibration of the surface of pneumatic acts in a way that it rejects the liquid 18 and various other dirtiness before the contact zone of the wheel. These positive effects take place in the precontact zone of pneumatic. The ultrasound vibration on the surface of pneumatic creates positive effects also in the contact zone 24 of pneumatic with tarmac 19 during the activation of safety systems of motor-cars. In order to have a better understanding of interaction of pneumatic and tarmac, we are going to briefly describe the main characteristics of the surface of tarmac. The most important characteristic of road surface, resp. tarmac is the texture of the surface of tarmac. Basically, the texture of tarmac directly affects the adhesiveness of the wheel tire to the road surface and it is primary connected to the safety conditions that are valid on the road. We basically divide the texture of the surface of tarmac to the micro and macro texture. Micro texture is made of an uneven area on the surface of individual small stones that are in the surface layer of the structure of tarmac. The size of the uneven area is below 0.5 mm. Macro texture is connected to the interspace, size, form and number of small stones which make the basis of the structure of tarmac. An interspace and size of small stones ranges between 0.05 mm-50 mm. Micro and macro texture of the surface of tarmac makes the contact zone of pneumatic.

In the contact zone 24 of pneumatic, the ultrasound vibration creates thermal friction through interaction of pneumatic and tarmac. High-frequent oscillations on the surface of pneumatic under the pressure of the weight of motor-car in interaction (rubbing) with tarmac 19 raises the temperature in the contact area 24 of the rubber of pneumatic. Due to the strong dynamic and static forces, the raising of temperature acts in a way that it softens the structure of rubber in the contact area of pneumatic and enables deeper penetration to the structure of tarmac. A softer structure of the rubber of pneumatic, which has the possibility of deeper penetration to the structure of tarmac, as a rule has a higher coefficient of friction and enables a shorter braking distance for motor-car.

The piezoelectric converter 1 generates ultrasound vibrations which spread out through the acoustic medium of suspension and wheel of motor-car by form of longitudinal waves. However, the vibrations on the surface of pneumatic appear in the form of transversal waves, which are manifested as the uneven areas on the surface of pneumatic. Since we know the characteristics of the components of acoustic system with a special focus placed onto pneumatic, by adjusting the vibration frequency, we can generate the uneven areas of precisely defined dimensions on the surface of the tire of pneumatic. High-frequent motion of transversal waves at the surface of pneumatic makes that the uneven areas act as sharp edges, the dimensions of which correspond to the dimensions of micro texture of tarmac (<0.5 mm). Compatibility of micro texture of the surface of pneumatic and micro texture of tarmac enables in a given point of time a significant increase of the contact surface between pneumatic and tarmac. Increasing the contact surfaces, we increase the coefficient of friction of pneumatic with tarmac and we significantly increase the active safety of motor-car.

All afore mentioned effects, which are made by ultrasound vibration on the surface of pneumatic, result in the increase of coefficient of friction with no disruption of operating life, resp. durability of pneumatic. As it is stated in the description of technical problem, the commercial pneumatic must meet the standards of useful operating life of pneumatic, limiting the potential of coefficient of friction which may be realised by pneumatic with tarmac. Higher coefficient of friction brings higher wear and tear, resp. wearing out of contact structure of the rubber of pneumatic, which results in the reduction of operating life of pneumatic. In everyday traffic the commercial pneumatic acts passively, resp. it has no possibility of adjusting to different circumstances such as braking and motion of motor-car. During the braking, the higher coefficient of friction is a positive phenomenon because it contributes to the shorter braking distance at cars. At motion, the higher coefficient of friction is less desirable phenomenon because it increases the resistance of wheeling that reduces the operating life of pneumatic and increases the consumption of fuel at motor-cars. However, this innovative system enables the pneumatic with active performances according to the needs in traffic. Active pneumatic is characterised by the fact that the ultrasound vibration appears on the surface of pneumatic—exclusively in the situations of activating the safety systems of motor-cars, resp. when the higher coefficient of friction is desirable.

The ultrasonic grip system activates at sudden braking, resp. at activating the ABS system. Also, the system activates on the occasion of activating the ESP and ASR systems.

Due to the activation of ABS system, resp. when the moto-car suddenly brakes, a central computer unit sends signal to the electric system of motor-car to let the voltage to the piezoelectric generator 1 which is installed on the suspension knuckle 9 of motor-car. The piezoelectric generator 1 transforms the electricity to the ultrasound mechanical vibrations which are then transformed through the acoustic medium of knuckle 9, ball bearing 10, wheel hub 11 and wheel rim 15 to the surface of tire 17. The ultrasound vibration on the surface of pneumatic creates more positive effects that result in the separation of the surface of tire 17 and liquid 18 from the tarmac if the braking of motor-car is carried out on the wet road surface. Also, the vibrations on the surface of pneumatic increase the contact surface of pneumatic with tarmac. This results in the increase of coefficient of friction, higher grip of pneumatic and reduction of the braking distance of motor-car.

When motor-car carries out the activation of ESP and ASR system, piezoelectric generator 1 creates ultrasound vibrations on the surface of that tire, by means of which the individual braking is done (ESP), resp. by means of which the traction of motor-car is increased (ASR).

7) METHOD OF THE INVENTION APPLICATION

In the afore mentioned way the invention enables the motor-car to have a instrument for optimization of contact area of the wheel during the braking (ABS) and activating of the ESP and ASR systems.

The whole system consists of the parts which may be integrated in a simple manner and connected to the standard components of wheels and suspension of motor-car. The parts of the system are characterised by low production price.

The innovative system finds its application in motor-car industry.

It will be obvious for the experts that some modifications may be made on the system towards this invention without leaving the essence and scope of invention.

The invention claimed is:

1. An ultrasonic grip system consisting of a piezoelectric generator capable of generating mechanical vibrations (1) with corresponding components of suspension and wheels of a motor-car, wherein the piezoelectric generator (1) is disposed on a suspension knuckle (9), and from there, creates mechanical vibrations on the surface of a tire when the motor-car breaks, through the acoustic medium of the suspension and the wheels.

2. The ultrasonic grip system of claim 1, wherein the piezoelectric generator (1) creates mechanical vibrations on the surface of the tire when ESP and ASR systems carry out a targeted braking.

3. The ultrasonic grip system of claim 1, wherein the piezoelectric generator (1) consists of the piezoelectric material, electrodes, screws, amplifiers and resonators.

4. The ultrasonic grip system of claim 1, wherein the piezoelectric generator (1) may be substituted by any device that produces vibrations.

5. The ultrasonic grip system of claim 1, wherein the piezoelectric generator (1) may be installed at any place in the motor-car except on a wheel rim or tire of the motor-car.

6. The ultrasonic grip system of claim 1, wherein the piezoelectric generator (1) is connected to an electric system of the motor-car.

7. The ultrasonic grip system of claim 1, wherein additional piezo generators are installed on suspension components of the motor-car that are capable of absorbing vibrations.

8. The ultrasonic grip system of claim 1, wherein a side wall of the tire consists of additional metal elements for the transmission of vibrations that connect a wire hoop at the side wall of the tire with the interwoven layers of steel wires in the crown of the tire.

* * * * *